(12) United States Patent
Hamanaka et al.

(10) Patent No.: US 6,649,244 B2
(45) Date of Patent: Nov. 18, 2003

(54) CERAMIC HONEYCOMB CATALYST CARRIER AND METHOD OF PRODUCING THE SAME

(75) Inventors: Toshiyuki Hamanaka, Nagoya (JP); Kyoko Makino, Nagoya (JP); Yasushi Noguchi, Nagoya (JP)

(73) Assignee: NGK Insulators, Ltd. (JP)

( * ) Notice: Subject to any disclaimer, the term of this patent is extended or adjusted under 35 U.S.C. 154(b) by 11 days.

(21) Appl. No.: 09/959,211

(22) PCT Filed: Jan. 26, 2001

(86) PCT No.: PCT/JP01/00555

§ 371 (c)(1),
(2), (4) Date: Jan. 17, 2002

(87) PCT Pub. No.: WO01/60514

PCT Pub. Date: Aug. 23, 2001

(65) Prior Publication Data

US 2002/0180118 A1 Dec. 5, 2002

(30) Foreign Application Priority Data

Feb. 21, 2000 (JP) ......................................... 2000-042382

(51) Int. Cl.$^7$ .................................................. B32B 3/12
(52) U.S. Cl. ....................... 428/116; 428/188; 428/174; 428/304.4; 428/34.4; 55/523; 422/180; 422/222; 264/630; 264/631; 264/656; 264/660; 264/661
(58) Field of Search ................................ 428/116, 117, 428/118, 188, 174, 34.1, 34.4, 304.4; 55/522, 523; 264/629, 630, 631, 628, 603, 653, 654, 656, 660, 661; 422/168, 177, 180, 211, 222

(56) References Cited

U.S. PATENT DOCUMENTS 5,334,570 A 8/1994 Beauseigneur et al. ..... 502/304
5,997,984 A * 12/1999 Koike et al.

FOREIGN PATENT DOCUMENTS

| DE | 199 57 311 | | 5/2000 |
| JP | 2000-1365 | * | 1/2000 |
| JP | 2000-2253340 | * | 8/2000 |

* cited by examiner

Primary Examiner—Deborah Jones
Assistant Examiner—Wendy Boss
(74) Attorney, Agent, or Firm—Parkhurst & Wendel, L.L.P.

(57) ABSTRACT

A ceramic honeycomb catalyst carrier wherein a porosity is 20% or less and an average surface roughness (Ra) of a partition wall of the carrier is 0.5 $\mu$m or more is obtained by forming ceramic raw materials to obtain a ceramic honeycomb formed body; drying the ceramic honeycomb formed body to obtain a ceramic honeycomb dried-up body; roughening a surface of the partition wall of the ceramic honeycomb dried-up body by exposing the ceramic honeycomb dried-up body in an airflow in which polishing powders are included; and sintering the ceramic honeycomb dried-up body after a surface treatment, or, by forming ceramic raw materials to obtain a ceramic honeycomb formed body; drying and sintering the ceramic honeycomb formed body to obtain a ceramic honeycomb sintered body; and roughening a surface of the partition wall of the ceramic honeycomb sintered body by exposing the ceramic honeycomb sintered body in an airflow or a water flow in which polishing powders are included.

6 Claims, 1 Drawing Sheet

CERAMIC HONEYCOMB CATALYST CARRIER AND METHOD OF PRODUCING THE SAME

TECHNICAL FIELD

The present invention relates to a ceramic honeycomb catalyst carrier used for purifying an exhaust gas from automobile and so on and a method of producing the same.

BACKGROUND ART

A ceramic honeycomb catalyst carrier is used for fixing a catalyst for purifying an exhaust gas from automobile and so on. Generally, the ceramic honeycomb catalyst carrier has a plurality of partition walls each having a number of pores, on which γ-alumina having a high specific surface area and a catalyst are coated, thereby being used for automobile and so on. In view of a recent beef-up of exhaust gas regulation, it is required to make a thickness of the partition wall of the ceramic honeycomb catalyst carrier thin so as to improve a catalyst performance and an engine performance.

However, if the partition wall of the ceramic honeycomb catalyst carrier is made thin as mentioned above, a mechanical strength of the ceramic honeycomb catalyst carrier is decreased. In order to eliminate such a problem, in Japanese Patent Laid-Open Publication No. 10-174885 (JP-A-10-174885) for example, a technique, wherein a dense cordierite having a high strength and a porosity of 18% or less is obtained by controlling a raw material size of talc and an amount of CaO, is disclosed. However, if a porosity is decreased, a strength can be improved, but there arises a new problem such that a coatability of γ-alumina having a high specific surface area and catalyst is deteriorated.

DISCLOSURE OF INVENTION

An object of the invention is to eliminate the drawbacks mentioned above and to provide a ceramic honeycomb catalyst carrier having a sufficient strength as a catalyst carrier and excellent catalyst coatability even if a partition wall is thin and a method of producing the same.

According to the invention, a ceramic honeycomb catalyst carrier is characterized in that a porosity is 20% or less and an average surface roughness (Ra) of a partition wall of the carrier is 0.51 μm or more.

Moreover, according to a first aspect of the invention regarding a producing method, a method of producing the ceramic honeycomb catalyst carrier mentioned above, comprises the steps of: forming ceramic raw materials to obtain a ceramic honeycomb formed body; drying the ceramic honeycomb formed body to obtain a ceramic honeycomb dried-up body; roughening a surface of the partition wall of the ceramic honeycomb dried-up body by exposing the ceramic honeycomb dried-up body in an airflow in which polishing powders are included; and sintering the ceramic honeycomb dried-up body after a surface treatment.

Further, according to a second aspect of the invention regarding a producing method, a method of producing the ceramic honeycomb catalyst carrier mentioned above, comprises the steps of: forming ceramic raw materials to obtain a ceramic honeycomb formed body; drying and sintering the ceramic honeycomb formed body to obtain a ceramic honeycomb sintered body; and roughening a surface of the partition wall of the ceramic honeycomb sintered body by exposing the ceramic honeycomb sintered body in an airflow or a water flow in which polishing powders are included.

In the present invention, a ceramic honeycomb catalyst carrier, in which a porosity is 20% or less and a partition wall of the carrier is roughened so as to be an average surface roughness (Ra) of 0.5 1 μm or more, can be obtained by performing a surface treatment with respect to a surface of the partition wall preferably by means of polishing powders such as alumina and diamond after forming and drying ceramic raw materials or further after sintering a formed body. In this manner, it was found that it is possible to obtain a ceramic honeycomb catalyst carrier having a high strength and excellent γ-alumina or catalyst coatability.

In the present invention, the reason for defining an average surface roughness as 0.5 1 μm or more is that, if it is less than 0.5μm, γ-alumina and catalyst are not sufficiently coated thereon. Moreover, the reason for defining porosity as 20% or less is that, if it is larger than 20%, a sufficient strength can not be obtained. Further, the surface treatment mentioned above may be performed by circulating a liquid, in which polishing powders such as alumina and diamond are dispersed, by means of a pump, or, by exposing a ceramic honeycomb for a definite period of time in an atmosphere in which polishing powders are included in an airflow. Furthermore, as a material of the ceramic honeycomb catalyst carrier, use may be made of a popular ceramics such as partially stabilized zirconia, silicon nitride, alumina, silicon carbide, and zirconium phosphate, other than cordierite.

BEST MODE FOR CARRYING OUT THE INVENTION

Figure 1:
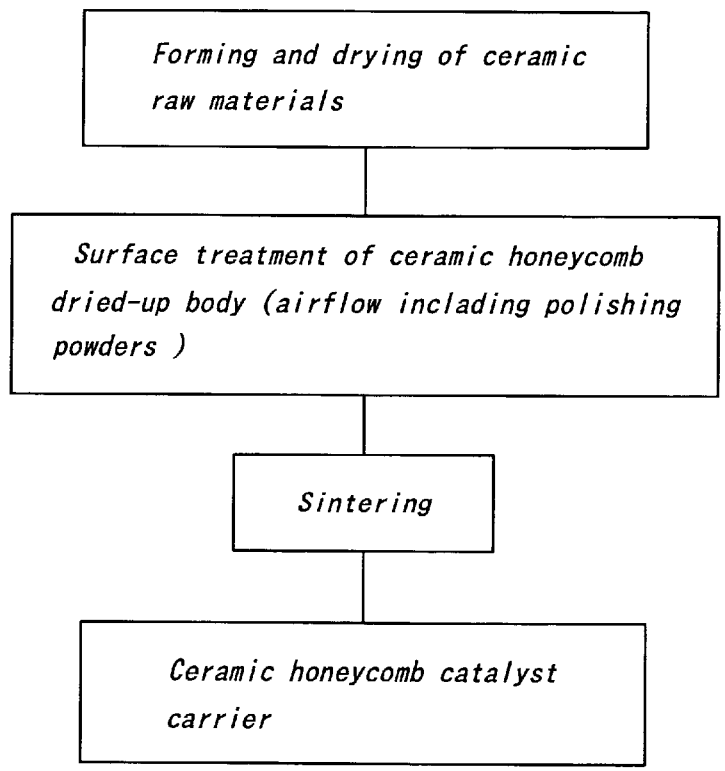
FIG. 1 is a flowchart for explaining a method of producing a ceramic honeycomb catalyst carrier according to a first aspect of the invention.

FIG. 1 is a flowchart for explaining a method of producing a ceramic honeycomb catalyst carrier according to a first aspect of the invention. Hereinafter, explanations are made with reference to FIG. 1. At first, ceramic raw materials are formed so as to obtain a ceramic honeycomb formed body, and the ceramic honeycomb formed body is dried so as to obtain a ceramic honeycomb dried-up body. Then, the ceramic honeycomb dried-up body is subjected to a surface treatment. The surface treatment according to a producing method of the second aspect of the invention is performed by exposing the ceramic honeycomb dried-up body for a predetermined period of time in an airflow in which polishing powders such as alumina, diamond and so on are included. Then, the ceramic honeycomb dried-up body after the surface treatment is sintered. In this manner, it is possible to obtain a ceramic honeycomb catalyst carrier according to the invention in which porosity is 20% or less and an average surface roughness (Ra) of a partition wall of the carrier is 0.5 μm or more.

Figure 2:
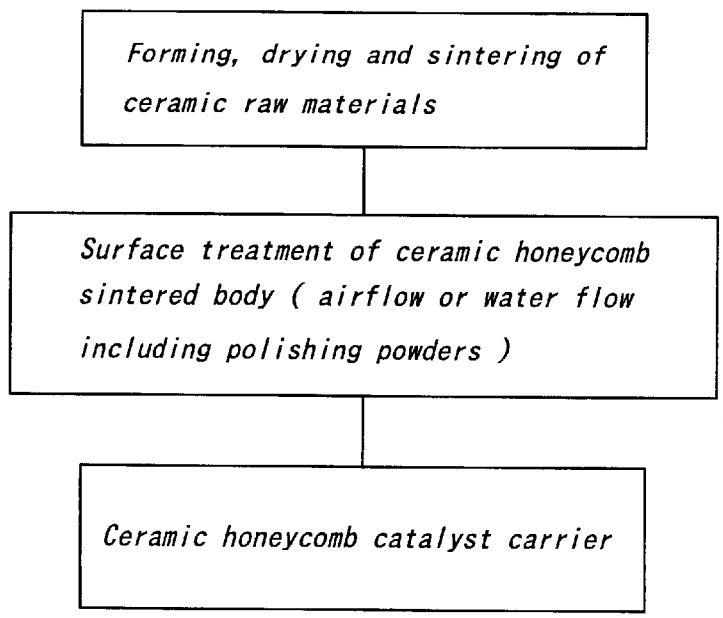
FIG. 2 is a flowchart for explaining a method of producing a ceramic honeycomb catalyst carrier according to a second aspect of the invention.

FIG. 2 is a flowchart for explaining a method of producing a ceramic honeycomb catalyst carrier according to a second aspect of the invention. Hereinafter, explanations are made with reference to FIG. 2. At first, ceramic raw materials are formed so as to obtain a ceramic honeycomb formed body, and the ceramic honeycomb formed body is dried and sintered so as to obtain a ceramic honeycomb sintered body. Then, the ceramic honeycomb sintered body is subjected to a surface treatment. The surface treatment according to a producing method of the first aspect of the invention is performed by circulating a liquid, in which polishing powders such as alumina and diamond are dispersed, by means of a pump, or, by exposing a ceramic honeycomb for a definite period of time in an atmosphere in which polishing powders are included in an airflow. In this manner, it is possible to obtain a ceramic honeycomb catalyst carrier according to the invention in which porosity is 20% or less and an average surface roughness (Ra) of a partition wall of the carrier is 0.51 μm or more.

It should be noted that use is made of all the known methods as a method for making porosity of the carrier to 20% or less. For example, it is possible to use a method for defining a raw material size of talc and an amount of CaO as disclosed in Japanese Patent Laid-Open Publication No. 10-174885 (JP-A-10-174885). Moreover, in the thus obtained ceramic honeycomb catalyst carrier according to the invention, it is preferred that a thickness of the partition wall is 60 μm or less and an opening rate of the honeycomb body is 88% or more. Further, it is preferred that the ceramic honeycomb catalyst carrier has ISO strength of 500 KPa or more. Furthermore, if an average surface roughness of the partition wall surface is 1.0 μm or more, it is possible to obtain further excellent coatability. Therefore, it is also a preferred embodiment.

Hereinafter, actual experiments will be explained.

According to the following methods, a ceramic honeycomb catalyst carrier was obtained by performing a producing of a honeycomb carrier and a surface treatment of the honeycomb carrier. After that, with respect to the thus obtained ceramic honeycomb catalyst carrier, porosity, flexural strength, hydrostatic pressure fracture strength, surface roughness, and coating amount were measured. Results of examples according to the invention and comparative examples without a scope of the invention are shown in the following Table 1.

Producing of Honeycomb Carrier

Raw materials such as talc, alumina, kaolin were blended to obtain a mixture having a cordierite composition. Then, with respect to the mixture, a suitable amount of crushed cordierite as a micro pore controlling agent, water-soluble cellulose derivatives, surface active agent and water were added so as to obtain a batch. Then, according to the known producing method, the batch was subjected to kneading, pugging, extrusion molding, drying and sintering so as to obtain a ceramic honeycomb catalyst carrier having a cordierite composition and a thickness of the partition wall shown in the following Table 1.

Surface Treatment of Honeycomb Carrier

A water-resistant fan was arranged in a tube which can perform an opening and closing motion, and the ceramic honeycomb sintered body was set in the tube in such a manner that through holes defined by the partition walls were aligned in a water flow direction of the fan. Then, a water flow was passed through the ceramic honeycomb sintered body by means of the fan. In this case, diamond polishing powders were dispersed between the fan and the ceramic honeycomb sintered body, thereby etching a surface of the partition wall of the ceramic honeycomb sintered body. After the etching process, the ceramic honeycomb sintered body was washed sufficiently and dried up so as to obtain a ceramic honeycomb catalyst carrier. The diamond polishing powders were collected so as to recycle them.

Porosity

According to a mercury injection method, a total micro pore capacity of the thus obtained ceramic honeycomb catalyst carrier was measured so as to calculate porosity. A true density of cordierite was assumed to be 2.52 g/cm$^3$. The measurement was performed by AutoPore 9405 by micromeritics.

Flexural Strength

According to the same producing method as that of the honeycomb carrier mentioned above, a cordierite flat plate having width of 30 mm, thickness of 7 mm and length of 150 mm was obtained. In this case, the surface treatment with respect to the flat plate was performed after sintering and machining processes. After finishing all the processes, a four point flexural strength was measured with respect to five samples on the basis of JIS R1601.

Hydrostatic Pressure Fracture Strength

The thus obtained ceramic honeycomb catalyst carrier was inserted in a flexible tube, and a hydrostatic pressure due to a water pressure was applied thereto. Then, a pressure (KPa), at which a partial fracture occurred, was measured. The number of samples was ten respectively.

Surface Roughness

An average surface roughness (Ra) of the partition wall of the thus obtained ceramic honeycomb catalyst carrier was measured by FTS-S4C manufactured by Taylor-Hobson Company. A calculation method is referred to JIS B0601. At a tip measurement portion, use was made of a 2 μm conical diamond.

Coating Amount

A coating amount (g/honeycomb cc) showing coatability of the thus obtained ceramic honeycomb catalyst carrier was measured as follows. A sample having a size of 100 mm×100 mm×100 mm was cut out from the ceramic honeycomb catalyst carrier. At the same time, 5% of alumina-nitrate sol and γ-alumina were mixed in a rate of 60:40 so as to prepare an alumina slurry. Then, the sample was immersed for a predetermined period of time in the alumina slurry. After that, the sample coated with the alumina slurry was dried and aged at 600° C. for one hour. The coating amount (g/honeycomb cc) showing coatability was calculated on the basis of a weight increase before and after the alumina slurry coating.

TABLE 1

|  | Example according to the invention | | | | Comparative example | |
| --- | --- | --- | --- | --- | --- | --- |
|  | 1 | 2 | 3 | 4 | 1 | 2 |
| Surface treatment | Yes | Yes | Yes | Yes | No | No |
| Partition wall thickness of carrier (μm) | 50 | 60 | 50 | 50 | 50 | 50 |
| Porosity of carrier (%) | 18 | 18 | 18 | 20 | 32 | 20 |
| Surface roughness (μm) | 2.0 | 1.5 | 0.5 | 0.7 | 1.9 | 0.3 |
| Flexural strength (MPa) | 42 | 42 | 43 | 38 | 21 | 40 |
| Hydrostatic pressure fracture strength (KPa) | 1370 | 1450 | 1380 | 1180 | 590 | 1200 |
| Coating amount (g/honeycomb cc) | 0.20 | 0.17 | 0.10 | 0.13 | 0.25 | 0.05 |

From the results shown in Table 1, the followings were understood. At first, in the example 1 according to the invention, when the surface treatment was performed and the surface roughness is 2.0 μm, it is possible to obtain a high coating amount and a low porosity, so that a high strength can be obtained. When the surface roughness was decreased, the coating amount was lowered in such a manner that the coating amount was 0.1 g/honeycomb cc at the surface roughness of 0.5 μm (the example 3 according to the invention). When the coating amount was decreased to a level of 0.05 g/honeycomb cc as shown in the comparative example 2, it was necessary to repeat the coating process again and again so as to obtain a sufficient coating amount necessary for a production, and thus it is not preferred. As seen from the examples 2 and 4 according to the invention, a decrease of partition wall thickness and an increase of porosity lead to a decrease of strength. When the porosity was very high as shown in the comparative example 1, the surface roughness was increased and at the same time the coating amount became very high. However, the hydrostatic pressure fracture strength was low.

From the results mentioned above, it was found that sufficient flexural strength, sufficient hydrostatic pressure fracture strength and sufficient coating amount could be obtained in the examples 1–4 according to the invention in which the porosity of the carrier was 20% or less and the surface roughness was 0.5 μm or more, and that strengths or coating amount were not sufficient in the comparative examples 1 or 2 in which either conditions of the porosity and the surface roughness was not satisfied.

In the examples 1–4 according to the invention, the surface treatment was performed for the ceramic honeycomb sintered body to obtain the ceramic honeycomb catalyst carrier, but it is possible to obtain the same results for the ceramic honeycomb catalyst carrier produced in such a manner that the surface treatment was performed for the ceramic honeycomb dried body.

Industrial Applicability

As clearly understood from the above explanations, according to the invention, a ceramic honeycomb catalyst carrier, in which a porosity is 20% or less and a partition wall of the carrier is roughened so as to be an average surface roughness (Ra) of 0.5 μm or more, can be obtained by performing a surface treatment with respect to a surface of the partition wall preferably by means of polishing powders such as alumina and diamond after forming and drying ceramic raw materials or further after sintering a formed body. Therefore, it is possible to obtain a ceramic honeycomb catalyst carrier having a high strength and excellent γ-alumina or catalyst coatability.

What is claimed is:

1. A ceramic honeycomb catalyst carrier characterized in that a porosity is 20% or less and an average surface roughness (Ra) of a partition wall of the carrier is 0.5 μm or more.

2. The ceramic honeycomb catalyst carrier according to claim 1, wherein a thickness of the partition wall is 60 μm or less.

3. The ceramic honeycomb catalyst carrier according to claim 1, wherein the carrier includes a cordierite composition as a main ingredient.

4. The ceramic honeycomb catalyst carrier according to claim 1, wherein an average surface roughness (Ra) of the partition wall of the carrier is 1.0 μm or more.

5. A method of producing the ceramic honeycomb catalyst carrier set forth in claim 1, comprising the steps of: forming ceramic raw materials to obtain a ceramic honeycomb formed body; drying the ceramic honeycomb formed body to obtain a ceramic honeycomb dried-up body; roughening a surface of the partition wall of the ceramic honeycomb dried-up body by exposing the ceramic honeycomb dried-up body in an airflow in which polishing powders are included; and sintering the ceramic honeycomb dried-up body after a surface treatment.

6. A method of producing the ceramic honeycomb catalyst carrier set forth in claim 1, comprising the steps of: forming ceramic raw materials to obtain a ceramic honeycomb formed body; drying and sintering the ceramic honeycomb formed body to obtain a ceramic honeycomb sintered body; and roughening a surface of the partition wall of the ceramic honeycomb sintered body by exposing the ceramic honeycomb sintered body in an airflow or a water flow in which polishing powders are included.

* * * * *